United States Patent [19]
Silingardi et al.

[11] Patent Number: 5,213,598
[45] Date of Patent: May 25, 1993

[54] PREPARATION OF VITREOUS ENAMELS AND MANUFACTURE OF ENAMEL BODIES

[75] Inventors: Vitaliano Silingardi, Bologna, Italy; Francois Toussaint, Montignies-le-Tilleul; Pierre Goelff, Nalinnes, both of Belgium

[73] Assignees: Azienda S.R.L., Bologna, Italy; Glaverbel, Brussels, Belgium

[21] Appl. No.: 773,457

[22] Filed: Oct. 9, 1991

[30] Foreign Application Priority Data

Oct. 15, 1990 [IT]  Italy .................................. 3700 A/90
Nov. 23, 1990 [GB]  United Kingdom ................. 9025501

[51] Int. Cl.$^5$ ............................................. C03B 20/00
[52] U.S. Cl. ...................................... 65/18.1; 65/18.3; 65/21.3; 65/60.5
[58] Field of Search ....................... 65/18.1, 18.2, 18.3, 65/21.3, 60.5

[56] References Cited

U.S. PATENT DOCUMENTS

| | | | |
|---|---|---|---|
| 1,929,425 | 10/1933 | Hermann | 65/18.1 X |
| 1,995,803 | 3/1935 | Gilbert | 65/21.3 |
| 2,044,680 | 6/1936 | Gilbert | 65/21.3 |
| 3,846,098 | 11/1974 | Nakashima et al. | 65/18.3 |
| 4,105,426 | 8/1978 | Iber et al. | 65/18.3 |
| 5,100,451 | 3/1992 | Toussaint et al. | 65/18.1 |

*Primary Examiner*—Robert L. Lindsay
*Attorney, Agent, or Firm*—Spencer, Frank & Schneider

[57] ABSTRACT

In order to prepare particles of a vitreous enamel for use in forming a vitreous enamel body by fusing the particles together to form the body, at least one enamel frit and at least one non-vitreous additive are formed into an agglomerated granular feedstock and passed through a heating chamber whereby such feedstock becomes at least partially molten and rounded, whereafter the resulting rounded vitreous enamel beads are caused or allowed to cool to a temperature below their melting point.

21 Claims, 1 Drawing Sheet

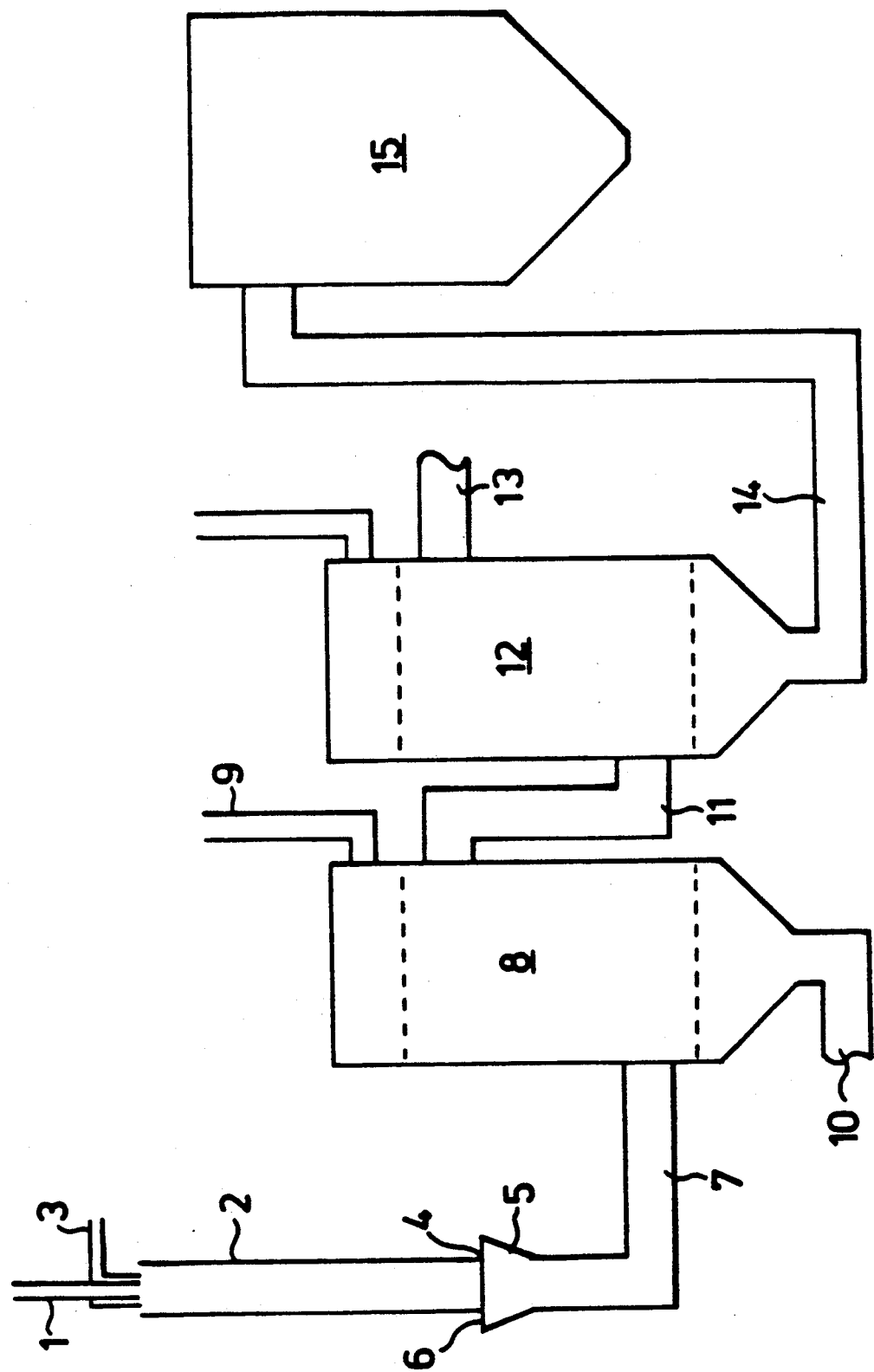

PREPARATION OF VITREOUS ENAMELS AND MANUFACTURE OF ENAMEL BODIES

BACKGROUND OF THE INVENTION

1. Field of the invention

This invention relates to a method of preparing particles of a vitreous enamel for use in forming a vitreous enamel body by fusing the particles together to form the body. The invention includes a process of manufacturing such a vitreous enamel body.

The expression "vitreous" is used herein to denote materials which include a glassy phase. Vitreous materials thus comprehend partially vitrified materials which also include one or more crystalline phases as well as wholly vitrified materials.

As is well known, enamel bodies such as coatings are applied to a wide variety of articles for decorative purposes, to facilitate cleaning, to protect the article, or for some other reason or combination of reasons. Such articles may be of a ceramic nature, for example pottery, earthenware, vitreous china, stoneware or porcelain, or they may be of metal, for example cast iron. Examples of particular products include bricks, tiles, sanitary ware, bath-tubs and domestic cookers.

2. Description of the Related Art

In the classical enamelling process as usually applied industrially, a base enamel is chosen for its composition in order that it may confer appropriate properties on the enamel glaze formed, taking into account the nature of the article being glazed. Such a base enamel may be in the form of a single frit, or it may be constituted by two or more base frits. A wide variety of such base frits is commercially available. Such base frits are often compounded to result in a transparent colourless glaze, and, unless a transparent colourless enamel glaze is required, it is the normal commercial practice to mix the base frit with a nonvitreous colouring agent and/or opacifying agent such as talc, kaolin or zircon. Colouring and opacifying agents are also widely available commercially. In commercial practice, a premixed enamel composition may be bought from an enamel supplier for application to the articles to be glazed, or a base frit and additives, such as colouring agents for addition to the frit may be purchased separately and mixed as desired. The various ingredients, which are available in the form of crushed particles, are mixed together in appropriate proportions and are formed into rather friable agglomerated granules. In order to apply the enamel, the agglomerated granules of mixed frit and additives are emulsified to form a slip or barbotine which is then applied to the article to be glazed, whether as a substantially uniform coating or in some pattern, and the article is placed in a kiln where the enamel is fused together and to the article.

Such a process suffers from a number of disadvantages. It is very difficult to ensure constancy of application of enamel of uniform composition during a lengthy production run. The slips may not be stable due to decomposition of the emulsifying agents used. The slips are usually applied to the articles by spraying, and this is messy and wasteful, and requires frequent cleaning of the working area. Furthermore, the waste material may well contain boron or other materials which cannot be discharged to waste without taking special precautions. Also, the firing of the enamel requires a great deal of energy.

The known particles may also be applied by a dry technique to a substrate but this technique also suffers from disadvantages. It is difficult to distribute and fix dry ground enamels onto a substrate. Moreover, they absorb humidity forming lumps which make their uniform distribution even more difficult.

SUMMARY OF THE INVENTION

It is an object of this invention to provide a method of preparing particles of a vitreous enamel which enables at least some of these disadvantages to be alleviated.

According to the present invention, there is provided a method of preparing particles of a vitreous enamel for use in forming a vitreous enamel body by fusing the particles together to form the body, characterized in that at least one enamel frit and at least one non-vitreous additive are formed into an agglomerated granular feedstock and passed through a heating chamber whereby such feedstock becomes at least partially molten and rounded, whereafter the resulting rounded vitreous enamel beads are caused or allowed to cool to a temperature below their melting point.

We note here that since enamel frits are in general mixtures of oxides, they do not have a precise melting point. In this specification therefore, we use the expression "melting temperature", and by that we denote the lowest temperature at which a liquid phase is detectable in the heated material.

Such method of preparing enamel particles has several advantages. During the rounding, while the feedstock granules are at least partially molten, the composition of each feedstock granule becomes more uniform. Clearly, if the whole of a feedstock granule becomes molten, then its constituents can become intimately mixed, but even if part of a feedstock granule is not melted, it will to a greater or lesser extent become digested by the molten part of that feedstock granule, to give a more nearly homogeneous enamel bead. This is not to say that the method of the invention will ensure that there will necessarily be uniformity of composition as between different enamel beads, for that will depend on the way in which the feedstock was prepared, but rather that the composition within a given bead will be more nearly homogeneous. Nevertheless, this promotes reproducibility of enamel coating composition over the course of an enamelling production run.

The feedstock may contain a single enamel frit, or it may contain a mixture of two or more different frits in order to confer some particular desired property or combination of properties on the vitreous enamel beads and/or on the finally resulting enamel coating.

The feedstock is easily prepared from a blend of one or more frits and other raw materials such as oxide, silicates, and alumino-silicates. The blend may duplicate the composition of a known enamel having particular desired physico-chemical and aesthetic properties. The blend is ground as desired, for example under humid conditions in a ball-mill. Grinding the blend particles finely tends to promote homogeneity of composition in the vitreous enamel beads to be formed. The result of wet milling is a suspension of the enamel ingredients. A binder may be added to that suspension as will be adverted to later in this specification, and it may be spray dried to obtain a dry granular feedstock for feeding to the heating chamber for the formation of the vitreous enamel beads. The heating chamber may form part of a spherulizing furnace of the type which is known for use in the manufacture of glass microbeads.

It is actually rather surprising that the invention does enable the formation of rounded enamel beads of a more nearly homogeneous composition, because one would expect that the grains of the feedstock, which would normally be only weakly bound together, would come apart during such heating due at least in part to the potentially very large differences between the coefficients of thermal expansion of the vitreous and non-vitreous ingredients.

Furthermore, the method allows regularization of the size, as well as effecting regularization of the shape, of the enamel beads which will be applied to the article to be enamelled. This has the effect, for an enamel of a given composition, of allowing a smoother surface to be achieved in the enamel coating at lower temperatures and/or with shorter heating times, thus saving on energy at the enamel firing stage. Also, conditions within the heating chamber may be controlled so that any desired extent of vitrification of the feedstock takes place during spherulization. Heating in the chamber may be controlled so that a crystalline phase is left in the enamel beads for example to achieve some desired aesthetic effect. This is advantageous in some cases since certain aesthetic effects cannot be obtained without the presence of an incompletely vitrified phase. The present invention allows, for instance, manufacture of articles having an aspect similar to that obtained by known techniques but without the drawbacks of those techniques. For example it is not difficult to establish by trials the extent of heating which will result in beads having a glassy surface which encloses partially crystalline central portions of the beads. This result cannot be obtained if all raw materials were mixed in the melting oven where the frits are prepared. Alternatively, such heating may be controlled so that endothermic reactions, such as vitrification, which are to take place between the enamel constituents take place during the rounding step, rather than during firing of the enamel after it has been applied as a coating. This also saves energy at that firing stage. This allows considerable overall energy saving because at the rounding stage, it is of course only necessary to heat the beads of enamel, and not any article to which the enamel is to be applied as a coating, and the firing of the enamel coating can take place at lower temperatures. A greater degree of vitrification of the beads also tends to promote homogeneity of composition within each bead, and in some circumstances this can afford the enamel a greater covering power.

A further advantage of preparing enamel beads in a manner according to the invention is that, because their size and shape can be easily regularized, such beads are better adapted for applying to an article by various techniques. Spraying of a slip or barbotine containing such beads is simplified. Serigraphic application of such beads is simple. Furthermore, an electrostatic spraying technique may be used because the resulting enamel beads are rounded and non-friable. The use of an electrostatic spraying technique has the advantage of avoiding the mess in using a slip or barbotine, and also allows saving of the considerable amounts of time and/or energy which would be required for evaporating the suspension medium of such a slip when the coating comes to be fired.

Yet a further advantage of adopting the present invention is that it results in a safer product. It has been stated that commerically available frits are formed of crushed enamel. Unless special filtering steps are taken, such crushed enamel frits will inevitably contain fine and sharp dust, in particular particles in the size range of about 0.5 $\mu$m to 5 $\mu$m. Many of the additives in view, such as pigments and opacifying agents may be similarly sized. Such particles can be dangerous if inhaled. They are small enough to enter the lungs, but large enough to resist removal. By the very nature of the rounding process, such small particles are largely eliminated because they tend to merge together or to become consumed by bigger particles.

Furthermore, the adoption of the present invention facilitates the automation of subsequent steps in the production of enamelled articles because the enamel beads produced are of more consistent composition and have improved handling qualities.

In preferred embodiments of the invention, the feedstock is passed generally vertically, and preferably vertically downwardly, through a said heating chamber. Vertical passage of the feedstock through the chamber reduces contact with the chamber walls, so resulting in a more uniform product. Passing the feedstock downwardly is preferred because it is more efficient and avoids losses due to a proportion of feedstock granules falling out of an upwardly moving stream of hot gases, and it does not require a high gas flow for supporting the granules.

Advantageously, the feedstock granules are passed through a flame whose maximum temperature is at least 1000° C. This allows effective rounding homogenization and vitrification of the feedstock granules during their dwell time in the flame.

Preferably, the feedstock granules are passed through a flame whose maximum temperature is between 100° C. and 200°, preferably between 150° C. and 200° C., above the melting temperature of the feedstock. This promotes a good yield of rounded enamel beads in relation to the energy consumed in heating them.

Advantageously, the feedstock is preheated before it enters the heating chamber. This reduces thermal shock to the ingredients of the feedstock when the latter is exposed to a flame in the heating chamber, and reduces any risk that the feedstock particles will burst apart in that chamber so enhancing the yield of the process.

Preferably, the feedstock contains a binder. A binder is useful for keeping the feedstock granules intact on introduction into the heating chamber, and it also facilitates handling of the feedstock prior to such introduction. There is a wide range of binders which may be used. For example carboxymethylcellulose may be used as binder. Advantageously, however, said binder is essentially constituted by an inorganic material which is adapted to become incorporated into the enamel composition. Suitable compositions include sodium silicate and compositions based on borates and phosphates. Such materials are compatible with many enamel compositions and are capable of entering into a vitreous phase.

Preferably, beads leaving the heating chamber are passed to a filter adapted for the elimination of oversized and/or undersized beads. There are different optimum bead sizes for different coating techniques. Advantageously, for electrostatic spraying, the rounded enamel beads are screened to yield a fraction having grain sizes between 40 $\mu$m and 120 $\mu$m. In other preferred embodiments, suitable for other coating techniques, the rounded enamel beads are screened to yield a fraction having grain sizes between 100 $\mu$m and 2 $\mu$mm. In yet other preferred embodiments, a size fraction below 40 μm is used. Such small enamel beads are particularly useful if it is desired to apply an enamel coating having a fine pattern.

The yield of rounded enamel beads which lies within a given size range is enhanced by ensuring that the feedstock granules have an upper size limit which broadly corresponds to the upper size limit of the enamel beads which it is desired to produce, or at least, lies within the desired range of enamel bead sizes. It is therefore preferred that the feedstock granules have a maximum dimension which does not exceed 2 mm, and in some preferred embodiments of the invention, the feedstock granules have a maximum dimension which does not exceed 120 μm.

The invention extends to enamel beads which have been rounded by a method according to this invention, and the invention also includes beads of vitreous enamel which comprise particles of non-vitreous additive material held in a rounded vitreous matrix.

The invention also extends to a process of forming a vitreous enamel body by fusing such beads together to form the body. Such a process allows improved economy in production and also allows improved smoothness in finish and uniformity of composition of the enamel body.

Advantageously, the beads are fired to fuse them together while they are still hot from their rounding. This further promotes fuel economy at the firing stage.

Preferably, said beads are applied to an article in dry state and fused together to form a coating thereon. This avoids the necessity of forming a slip or barbotine, and thus avoids the disadvantages of mess, possible instability of the slip, and the need to evaporate the suspension medium which are associated with the use of slips.

Advantageously, said beads are applied to said article by electrostatic spraying. This is a very simple and convenient method of applying a uniform coating of dry particles to an article.

BRIEF DESCRIPTION OF THE DRAWINGS

The drawings show a system of preparing the particles of the invention.

DESCRIPTION OF THE PREFERRED EMBODIMENTS

Preferred embodiments will now be described by way of example only, with reference to the accompanying diagrammatic drawing which shows a plant suitable for preparing beads of vitreous enamel by a method in accordance with this invention.

With reference to the drawing, agglomerated granular feedstock consisting of a mixture of particles of at least one enamel frit and at least one non-vitreous additive is fed down a feed tube 1 to the top end of a heatable furnace chamber 2 which is arranged substantially vertically. The feed tube 1 is surrounded by a burner tube 3 for the injection of a gaseous fuel into the top end of the furnace chamber 2, so that the feedstock granules become rounded while they are enveloped by the resulting flame as they travel down the furnace chamber 2. In a specific example of the process, the furnace chamber 2 is about 2.5 m in length and the burner tube 3 is fed with a combustible mixture made up of 10 parts by volume air and three parts mains (natural) gas. Additional air enters the furnace chamber 2, for example through the feed tube 1. This results in a temperature profile along the centre of the furnace tube as follows: at 60 cm from the burner nozzle, the temperature is 1,050° C., at 110 cm it is 1,050° C., and at 180 cm it is 950° C. Such a temperature regime is sufficient to melt the majority of the enamel constituents in view. This is not to say that all enamel constituents will become molten. For example zirconia is often added to glazing enamel compositions as an opacifier. It is most unlikely that such zirconia would become molten, though part of it could become digested by the melt resulting from heating other ingredients with lower melting temperatures. The use of such an excess of air in the combustible mixture also ensures that there is an oxidizing atmosphere within the furnace chamber, and this avoids that any lead (II) oxide in the feedstock will become reduced to metallic lead.

At the base 4 of the furnace chamber 2, the now rounded vitreous enamel beads enter a funnel 5. The top 6 of the funnel 5 may be open to atmosphere so that ambient air is drawn into the stream of rounded enamel beads in order to promote cooling to below the melting temperature of the enamel if this is required, and/or to allow pressure equalization.

The rounded vitreous enamel beads pass from the funnel 5 into a conduit 7 and thence, in the arrangement illustrated, to a filter 8 through which they are drawn by an extractor 9. Oversized rounded enamel beads are drawn off from the base of the filter 8 and passed along conduit 10 for crushing, agglomerating and recycling through the furnace chamber 2. The remaining rounded enamel beads are passed through a further conduit 11 to a second filter 12, whence undersized rounded enamel beads are passed along a conduit 13 for agglomerating and recycling. The remaining rounded enamel beads which are of a desired size range are drawn off from the base of this second filter and passed by a further conduit 14 to a hopper such as 15 either for storage for subsequent use, or, as is preferred, for direct feed, while the beads still retain heat from the rounding, to an applicator such as an electrostatic spray gun for application to an article to be enamelled.

Feedstock fed to the feed tube 1 is preferably preheated, since this serves to drive off any humidity so helping to avoid undesired clumping together of the feedstock and helps to reduce thermal shock when the feedstock enters the furnace chamber 2. The yield of enamel beads of the desired size is promoted by ensuring that the feedstock is also appropriately sized. This means, in general, that it is desirable for the feedstock granules to have a maximum dimension which is not greater than the maximum dimension of enamel beads to be produced.

If desired, the walls of the furnace chamber 2 may be cooled. This has the advantages of preserving the furnace chamber walls and reducing any tendency for the granules to adhere to those walls during their downward travel, albeit at the cost of some heat energy loss. However, the gain in yield may make such cooling more energy efficient and the increase in furnace life is also valuable.

The following are examples of base frits for incorporation into rounded enamel beads by a method according to this invention:

| Frit blend % by weight | Ex 1 | Ex 2 | Ex 3 | Ex 4 | Ex 5 | Ex 6 |
|---|---|---|---|---|---|---|
| Borax | 66 | — | 66 | — | 66 | — |
| Boric acid | — | 38.5 | — | 38.5 | — | 38.5 |
| Quartz | 34 | 10 | 34 | 10 | 34 | 10 |

-continued

| Frit blend % by weight | Ex 1 | Ex 2 | Ex 3 | Ex 4 | Ex 5 | Ex 6 |
| --- | --- | --- | --- | --- | --- | --- |
| Marble | — | 40.9 | — | 40.9 | — | 40.9 |
| Kaolin | — | 10.6 | — | 10.6 | — | 10.6 |

The respective enamel frits are mixed with various additives and formed into feedstocks having the following compositions:

| Feedstock blend % by wt | Ex 1 | Ex 2 | Ex 3 | Ex 4 | Ex 5 | Ex 6 |
| --- | --- | --- | --- | --- | --- | --- |
| Frit | 35.9 | 15.8 | 23.4 | 20 | 31.2 | 11.9 |
| Feldspar | 10.6 | — | — | 23.8 | 5.5 | 32 |
| Minium | 24.7 | — | — | — | — | — |
| Kaolin | 11.2 | 12.5 | 15.2 | 4.4 | 10.2 | — |
| Marble | 11 | 1 | 8.2 | 6.2 | 7.1 | 5.7 |
| Quartz | 6.6 | 7.8 | 2.6 | 5.4 | 10.9 | 10.9 |
| $PbO \cdot 2SiO_2$ | — | — | 50.6 | — | 35.1 | 39.5 |
| $PbO \cdot 1.5SiO_2$ | — | 62.9 | — | 40.2 | — | — |

These materials are weakly agglomerated together to form rather friable granules. Such granular feedstock is then subjected to a rounding process as described to form roughly spheroidal beads of enamel. During such rounding, the enamel beads may also become vitrified, or further vitrified, and the distribution of the various ingredients within such individual vitreous beads becomes more uniform than the distribution of the various ingredients within the granules of the feedstock used because of the melting and digesting processes which may take place.

Compositions of the enamel beads formed on rounding of the feedstocks mentioned above are as follows, Seger formulae:

| | Ex 1 | Ex 2 | Ex 3 | Ex 4 | Ex 5 | Ex 6 |
| --- | --- | --- | --- | --- | --- | --- |
| PbO | 0.33 | 0.70 | 0.50 | 0.39 | 0.39 | 0.40 |
| $K_2O$ | — | — | — | 0.04 | — | 0.20 |
| $Na_2$ | 0.33 | — | 0.35 | 0.09 | 0.34 | — |
| CaO | 0.34 | — | 0.25 | 0.48 | 0.27 | 0.40 |
| $Al_2O_3$ | 0.31 | 0.20 | 0.20 | 0.21 | 0.19 | 0.20 |
| $SiO_2$ | 1.73 | 2.00 | 2.20 | 1.92 | 2.70 | 2.75 |
| $B_2O_3$ | 0.53 | 0.40 | 0.40 | 0.44 | 0.61 | 0.30 |

The following are further examples of mixed compositions for use as feedstocks, parts by weight

| Material | Ex. 7 | Ex. 8 | Ex. 9 | Ex. 10 |
| --- | --- | --- | --- | --- |
| CaO | 8.14 | 3.23 | 1.86 | 4.91 |
| $K_2O$ | 2.73 | 2.51 | 0.55 | 0.66 |
| $Na_2O$ | 4.01 | 3.38 | 4.28 | 2.56 |
| $Fe_2O_3$ | 0.22 | 0.13 | 0.15 | 0.17 |
| $SO_3$ | 0.21 | 0.55 | 0.27 | 0.38 |
| $TiO_2$ | 0.13 | 0.07 | 0.05 | 0.06 |
| $Al_2O_3$ | 8.05 | 5.03 | 14.60 | 7.58 |
| MgO | 1.20 | 0.26 | 0.29 | 0.23 |
| BaO | 0.75 | 0.07 | 0 | 0 |
| ZnO | 6.19 | 4.42 | 2.04 | 2.26 |
| PbO | 0.90 | 30.74 | 28.06 | 37.07 |
| $ZrO_2$ | 1.77 | 3.18 | 4.64 | 1.90 |
| $B_2O_3$ | 9.45 | 9.84 | 3.68 | 6.32 |
| $SiO_2$ | 56.25 | 36.60 | 39.53 | 35.90 |
| | 100.00 | 100.01 | 100.00 | 100.00 |

These feedstock materials are again agglomerated to form granules.

This may readily be done by forming an aqueous suspension which is then spray-dried in a manner known per se. If desired a binder may be included in the suspending medium to facilitate handling of such granules before they are rounded as hereinbefore described. Such binder is suitably constituted by an inorganic material which will become incorporated into the enamel composition. In one variant, the binder used is hydrated sodium silicate. It will be noted that the enamel composition of many of the Examples hereof already effectively contain silica and sodium oxide.

Any of these enamel compositions may be screened to give vitreous rounded enamel beads of a desired size range. For example, the beads produced may be screened so that they substantially all fall within the size range 40 μm to 120 μm. Such beads may be fed to a hopper such as 15 for feeding directly to an electrostatic spraying apparatus for coating articles such as ceramic tiles as the latter advance along a conveyor line for passage through a tunnel kiln for firing of the enamel. In such a case, the enamel beads may still be hot from their rounding. As an alternative, such beads may be screened so that their size range is 100 μm to 1000 μm for mixing with a binder such as starch, to form a paste for application to an article by serigraphic means.

What is claimed is:

1. A method of preparing rounded vitreous enamel beads comprised of vitreous enamel for use in providing a vitreous enamel body by fusing the particles together to form the vitreous enamel body, the method comprising:
   a. forming at least one enamel frit and at least one non-vitreous additive into granules of an agglomerated granular feedstock;
   b. passing the agglomerated granular feedstock through a heating chamber under conditions effective to at least partially melt and round the agglomerated granular feedstock thereby providing rounded vitreous enamel beads; and
   c. cooling the rounded vitreous enamel beads to a temperature below their melting point.

2. The method according to claim 1, wherein the agglomerated granular feedstock is passed generally vertically through the heating chamber.

3. The method according to claim 2, wherein the agglomerated granular feedstock is passed generally vertically downwardly through the heating chamber.

4. The method according to claim 1, wherein the granules of an agglomerated granular feedstock are passed through a flame whose maximum temperature is at least 1000° C.

5. The method according to claim 1, wherein the granules of an agglomerated granular feedstock are passed through a flame whose maximum temperature is between 100° C. and 200° C. above the melting temperature of the feedstock.

6. The method according to claim 1, wherein the agglomerated granular feedstock is preheated before it enters the heating chamber.

7. The method according to claim 1, wherein the agglomerated granular feedstock additionally contains a binder.

8. The method according to claim 7, wherein the binder consists essentially of an inorganic material which is adapted to become incorporated into the enamel composition.

9. The method according to claim 1, further comprising passing the rounded vitreous enamel beads leaving the heating chamber through at least one filter effective to eliminate at least one of oversized beads and undersized beads.

10. The method according to claim 9, wherein the rounded vitreous enamel beads are screened in the at least one filter to yield a fraction having grain sizes ranging between 40 μm and 120 μm.

11. The method according to claim 9, wherein the rounded vitreous enamel beads are screened in the at least one filter to yield a fraction having grain sizes ranging between 100 μm and 2 mm.

12. The method according to claim 1, wherein the granules of an agglomerated granular feedstock have a maximum dimension which does not exceed 2 mm.

13. The method according to claim 12, wherein the granules of an agglomerated granular feedstock have a maximum dimension which does not exceed 120 μm.

14. A process of manufacturing a vitreous enamel body, comprising:
 a. providing rounded vitreous enamel beads by:
  1. forming at least one enamel frit and at least one non-vitreous additive into granules of an agglomerated granular feedstock;
  2. passing the agglomerated granular feedstock through a heating chamber under conditions effective to at least partially melt and round the agglomerated granular feedstock thereby providing rounded vitreous enamel beads; and
  3. cooling the rounded vitreous enamel beads to a temperature below their melting point; and
 b. fusing the rounded vitreous enamel beads together to form a vitreous enamel body.

15. The process according to claim 14, wherein the rounded vitreous enamel beads are fired to fuse them together while they are still hot from being rounded during forming in the heating chamber.

16. The process according to claim 14, further comprising applying the rounded vitreous enamel beads to an article in a dry state whereby fusing the rounded vitreous enamel beads together forms a coating on the article.

17. The process according to claim 16, wherein the rounded vitreous enamel beads are applied to the article by electrostatic spraying.

18. A process of manufacturing a vitreous enamel body, comprising:
 providing beads of vitreous enamel which comprise particles of non-vitreous additive material held in a rounded vitreous matrix; and
 fusing the beads together to form the vitreous enamel body.

19. The process according to claim 18, further comprising applying the beads to an article in a dry state whereby fusing the beads together forms a coating on the article.

20. The process according to claim 19, wherein the beads are applied to the article by electrostatic spraying.

21. The method according to claim 5, wherein the granules of an agglomerated granular feedstock are passed through a flame whose maximum temperature is between 150° C. and 200° C. above the melting temperature of the feedstock.

* * * * *